No. 655,301. J. HAMILTON. Patented Aug. 7, 1900.
BREAD OR CAKE KNIFE.
(Application filed July 20, 1899.)

(No Model.)

Witnesses
Ralph A. Shepard.
J. F. Riley.

James Hamilton, Inventor
By his Attorneys,
C. A. Snow & Co.

THE NORRIS PETERS CO., PHOTO-LITHO., WASHINGTON, D. C.

UNITED STATES PATENT OFFICE.

JAMES HAMILTON, OF NEWBURG, NEW YORK.

BREAD OR CAKE KNIFE.

SPECIFICATION forming part of Letters Patent No. 655,301, dated August 7, 1900.

Application filed July 20, 1899. Serial No. 724,517. (No model.)

*To all whom it may concern:*

Be it known that I, JAMES HAMILTON, a citizen of the United States, residing at Newburg, in the county of Orange and State of New York, have invented a new and useful Bread or Cake Knife, of which the following is a specification.

The invention relates to improvements in bread and cake knives.

The object of the present invention is to improve the construction of bread and cake knives and to provide a simple, inexpensive, and efficient one adapted to cut two slices simultaneously; and a further object of the invention is to arrange the blades so that the slice between them will not bind.

The invention consists in the construction and novel combination of parts hereinafter fully described, illustrated in the accompanying drawings, and pointed out in the claim hereto appended.

Figure 1:
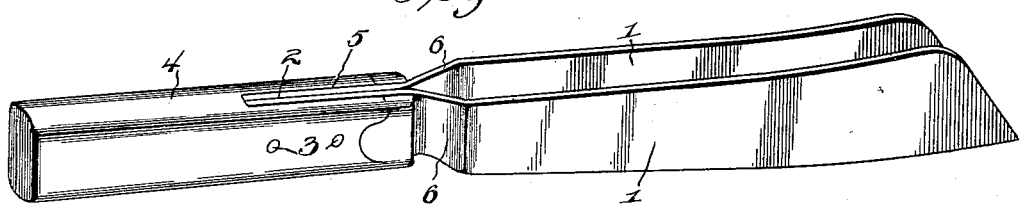
Figure 2:
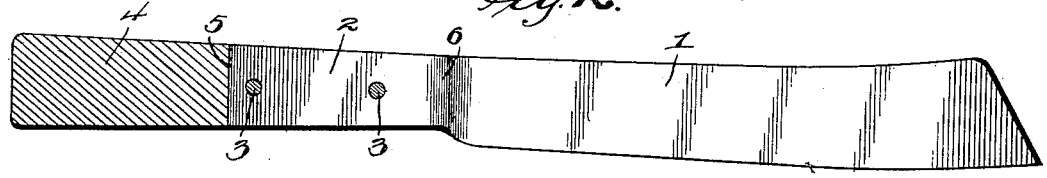
Figure 3:
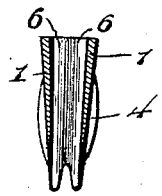

In the drawings, Figure 1 is a perspective view of a bread and cake knife constructed in accordance with this invention. Fig. 2 is a longitudinal sectional view. Fig. 3 is a transverse sectional view.

Like numerals of reference designate corresponding parts in all the figures of the drawings.

1 1 designate a pair of blades spaced apart to provide a passage or opening for a slice of bread, cake, or other material and provided at their inner ends with shanks 2, which are secured by rivets 3 or other suitable fastening devices to a handle 4. The handle 4, which may be of any desired construction, is provided with a slot or bifurcation 5, extending inward from one end and terminating near the center of the handle, and the shanks, which are arranged flat against each other, fit within the slot or bifurcation and have their outer portions 6 diverging to space the blades. The rivets 3, which secure the shanks and the handle together, are arranged in registering perforations of those parts. The blades 1, which may be of any desired configuration, are adapted for cutting two slices of bread, cake, or other material simultaneously, and they may be advantageously employed for chopping vegetables, meat, or other material. In order to prevent a slice of bread or cake from binding between the blades, the latter, as clearly illustrated in Fig. 3 of the accompanying drawings, are set at a slight angle and converge from their backs or rear edges to their cutting edges and from a flaring or tapering opening which gradually widens from the cutting edges to the rear edges and which is adapted to permit a slice to be readily withdrawn from between the blades without breaking the said slice.

It will be seen that the knife is exceedingly simple and inexpensive in construction, that it is adapted to cut two slices of bread or cake simultaneously, and that as the blades are set at an angle to provide a flaring or tapering space between them they will not bind against a slice and will permit the same to be readily removed from between them.

Changes in the form, proportion, size, and the minor details of construction within the scope of the appended claim may be resorted to without departing from the spirit or sacrificing any of the advantages of this invention.

What is claimed is—

A bread and cake knife comprising a handle having a bifurcation or opening, and a pair of blades having contiguous shanks rigidly secured to the handle and arranged within the bifurcation or opening, said blades being laterally bent and offset from each other and set at an angle and diverging from their cutting edges to their backs, whereby the space between them gradually increases in width to free the slice and prevent the same from binding against them, substantially as described.

In testimony that I claim the foregoing as my own I have hereto affixed my signature in the presence of two witnesses.

JAMES HAMILTON.

Witnesses:
 JOHN GREAVES,
 RUFUS W. MIDDLETON.